S. McDONALD.
PROCESS OF PRODUCING IRON AND STEEL.
APPLICATION FILED DEC. 6, 1916.
1,255,191.
Patented Feb. 5, 1918.
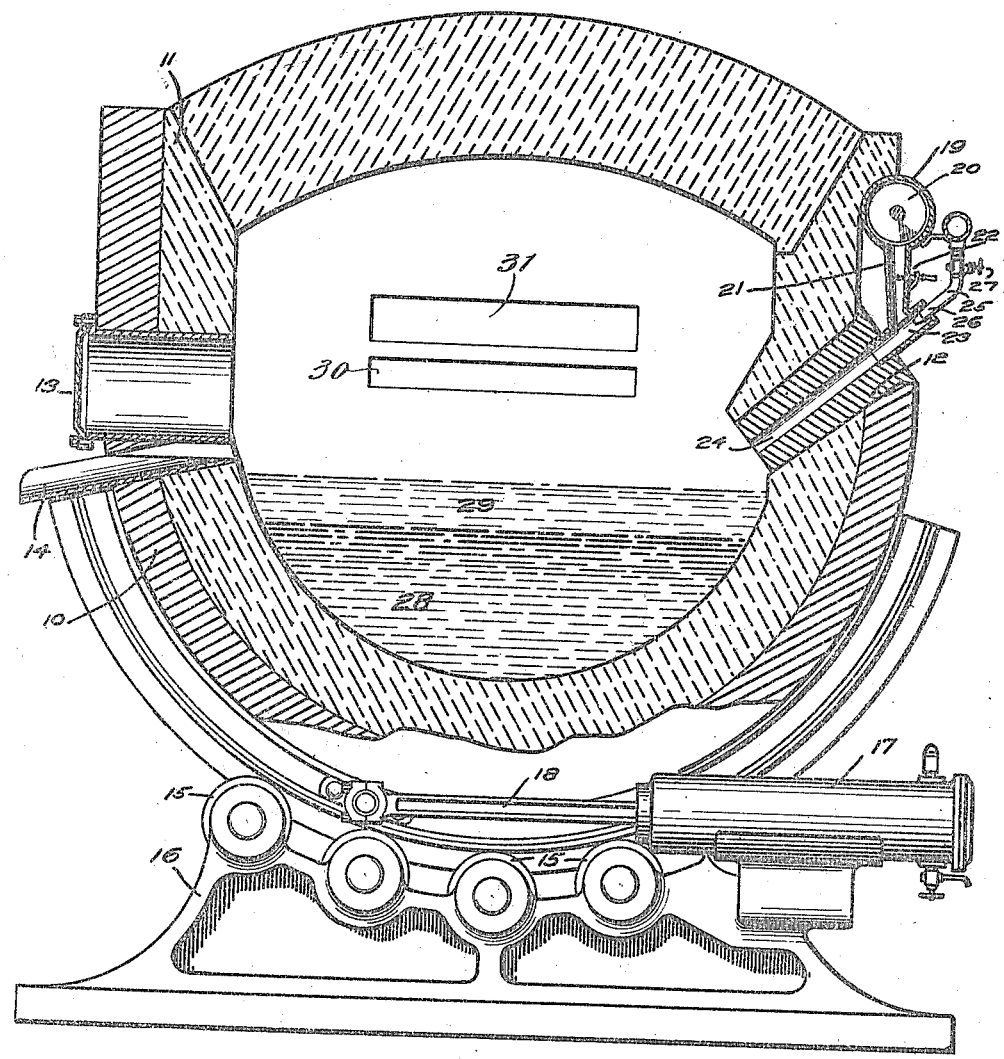
INVENTOR
SAMUEL McDONALD
ATTORNEYS

UNITED STATES PATENT OFFICE.

SAMUEL McDONALD, OF ALHAMBRA, CALIFORNIA.

PROCESS OF PRODUCING IRON AND STEEL.

1,255,191. Specification of Letters Patent. Patented Feb. 5, 1918.

Application filed December 6, 1916. Serial No. 135,399.

*To all whom it may concern:*

Be it known that I, SAMUEL McDONALD, a citizen of the United States, residing at Alhambra, in the county of Los Angeles and State of California, have invented new and useful Improvements in Processes of Producing Iron and Steel, of which the following is a specification.

My invention relates to a process of producing iron and steel from iron ore and steel scrap, or cast iron, and apparatus therefor.

It is known that iron or steel may be produced directly from the iron ore by melting the latter in a suitable electric furnace and refining the molten iron oxid by suitable reducing agents, such as carbon or hydro-carbon gases and the like. However, such a process has not proven a commercial success in all localities for the reason that the cost of electric power is too high. Furthermore, the reducing action is unsatisfactory because of the difficulty of quickly reducing the iron ore to iron or steel on a commercial scale and at a sufficiently low cost.

It is an object of this invention to provide a process of producing iron or steel, and apparatus therefor, in which a charge of molten iron or steel is covered with a layer of oxid of iron which, after being molten, is thoroughly mixed with the charge of iron and steel below by a current of non-oxidizing gas which carries with it powdered carbon. The carbon is partly dissolved in the charge of iron or steel. The dissolved carbon rapidly combines with the oxygen of the iron ore carried into the body of the molten iron or steel by the current of non-oxidizing gas, thereby bringing about a rapid refining of the oxid iron ore. The reduction of the iron ore is effected in a two-fold manner, by the combination of dissolved carbon in the charge of iron or steel just referred to and by the direct action of the undissolved carbon on the oxid iron ore.

It is another object of this invention to provide a process of reducing iron ore or steel which is rapid, easily carried on, low in cost, and which produces a superior product.

With the above and other objects in view, which will appear as the description proceeds, my invention consists in the steps of the process hereinafter described and the apparatus employed for carrying out said process.

In the accompanying drawings, which form a part of this specification, I have illustrated a convenient and practical apparatus for carrying on my process.

The figure of the drawing illustrates a transverse vertical section of a furnace of a tilting type some parts being shown in elevation for clearness of illustration, suitable for carrying out my new process.

10 designates the shell of the furnace which is preferably rectangular in shape, and has a refractory basic lining 11 through which inclined openings or twyers 12 are provided. The furnace is charged by means of charging doors 13, below which a spout 14, for pouring the finished iron or steel, is situated. 30 and 31 are the gas and air ports respectively for heating the furnace. The furnace is of the tilting type resting on anti-friction rollers 15 carried on a suitable base 16. A suitable mechanism 17, which, in the present instance is shown to be a cylinder operating a rod 18 connected with the furnace, is provided, whereby the furnace may be tilted. Horizontal pipe 19 for supplying pulverized carbon is provided in which a suitable scroll conveyer 20 is mounted and operated by any suitable means not shown. A vertical feed spout 21 provided with a suitable cut-off valve 22 leads to the mouthpiece 23 connected to the outer end of the central bore 24 of the twyer 12. A gas pipe 25 provided with a nozzle 26, projects into the mouthpiece 23 and serves to blow the carbon, or carbon fiber, or carbonaceous compounds through the central bore 24 into the charge of the furnace. A valve 27 is provided in the nozzle 26 whereby the current of gas may be controlled.

In carrying out my process, a charge of iron or steel scrap in sufficiently large amount to cover the bottom of the furnace, the furnace whose lining 11 should be of a refractory basic material, the charge may be introduced into the furnace either in a molten condition or may be melted or the solid iron or steel scrap may be melted after its introduction into the furnace. The charge of iron or steel is indicated by 28 covering the bottom of the furnace. A quantity of oxid of iron ore is now introduced into the furnace and forms a layer 29 on top of the bottom charge 28. The iron oxid ore is preferably heated or roasted before its introduction into the furnace in order to expel any moisture and perhaps partially reduce the oxygen in the ore. The temperature of the furnace should be very high, about 3000° F., the higher the better. While the melting point of pure iron oxid is higher than 3000° F., this temperature is usually sufficient to melt the ordinary iron oxid ore which usually carries an admixture of lime and silica whereby its melting point is reduced. After the iron oxid ore is molten the same is subjected to the reducing action as follows: Pulverized carbon of any suitable kind which, however, must be sufficiently free from moisture, sulfur and other substances that might injure the finished product, is blown into the molten charge in quantities sufficient to reduce the oxygen of the charge to the lowest possible practical point. By opening the valve 22 in the chute 21 and opening valve 27 in the nozzle 26, then tilting the furnace to the proper angle to bring the molten charge over the opening 24, the gas which is under suitable pressure will blow the carbon through the bore 24 of the twyer 12 into the molten charge. It should be noted that the direction of the current of gas and carbon is inclined to the level of the molten charge and toward the center of the bottom of the furnace. The gas that I propose to use in blowing the pulverized carbon into the molten mass is natural or manufactured gas sufficiently low in free oxygen to prevent oxidizing the carbon. In place of the natural or manufactured gas, any other non-oxidizing gas may be used. It may be found advantageous to use air mixed with the gas and carbon or air and carbon alone. There may be conditions when a little air mixed with gas may be more economical than gas alone. The action of the current of gas mixed with the carbon as stated, carries the molten oxid down and through the charge of refined iron lying directly under the molten oxid. The free carbon is rapidly dissolved in the refined iron and in this condition rapidly combines with the oxygen of the iron ore and reduces the latter. In addition to the reducing action of the dissolved carbon, the free carbon carried in by the gas will likewise combine with the oxygen of the molten ore and thus the iron ore is refined by the action of the dissolved carbon in the refined iron and free carbon carried in by the gas. If at any time it is found that the carbon content in the refined iron is too low, to reduce or react on the oxygen of the molten ore with sufficient rapidity, the operator may tilt the furnace in such a position that the lower end of the gas inlet will carry the incoming carbon through the refined iron, which will rapidly absorb or dissolve the free carbon from the gas blast. This may not at all times be necessary, but it can be done if the operator finds it necessary to do so to hasten the process of refining. Thus the reduction of the ore by the reaction of the dissolved carbon in the refined iron and by the direct action of the carbon in the incoming gas insures a rapid deoxidation of the ore.

Various changes in the details of the construction and operation of my invention will occur to those skilled in the art, without departing from the spirit of my invention as claimed, such as pouring the finished iron through spout 14, also pouring off the slag or gangue from time to time as the process proceeds.

While I have described here the process with the reduction of iron ores, it will be understood that the same is not limited thereto, but may be used in connection with any other ores capable of such reduction.

Best results are obtained by using powdered carbon in connection with the non-oxidizing gas, but a reducing gas may be used alone without any carbon in carrying out the process of reducing ores to a metallic state.

A small quantity of oil, preferably crude or partially refined mineral oil, may be atomized and blown into the charge by means of the gas current, either with or without the powdered carbonaceous material.

I claim:

1. A process of producing iron or steel providing a body of molten iron ore on top of the molten charge of iron or steel and blowing a gas containing a reducing agent downwardly against said iron ore, whereby portions of said iron ore are carried below the surface of said charge and reduced to iron or steel.

2. A process of producing iron or steel from iron ores, comprising melting a body of iron ore on top of a molten charge of iron or steel, and blowing a carbonaceous gas against said iron ore whereby said iron ore is carried below the surface of said charge and reduced to iron or steel.

3. A process of producing iron or steel from iron ores, comprising melting a body of iron ore on top of a molten charge of iron or steel, and blowing a non-oxidizing gas mixed with a powdered carbonaceous material against said iron ore whereby said iron ore is carried below the surface of said charge and reduced to iron or steel.

In testimony whereof I have signed my name to this specification.

SAMUEL McDONALD.